Sept. 9, 1952 J. A. ELMES 2,609,610
GAUGE FOR ROLL CROWNS
Filed May 1, 1950 2 SHEETS—SHEET 1
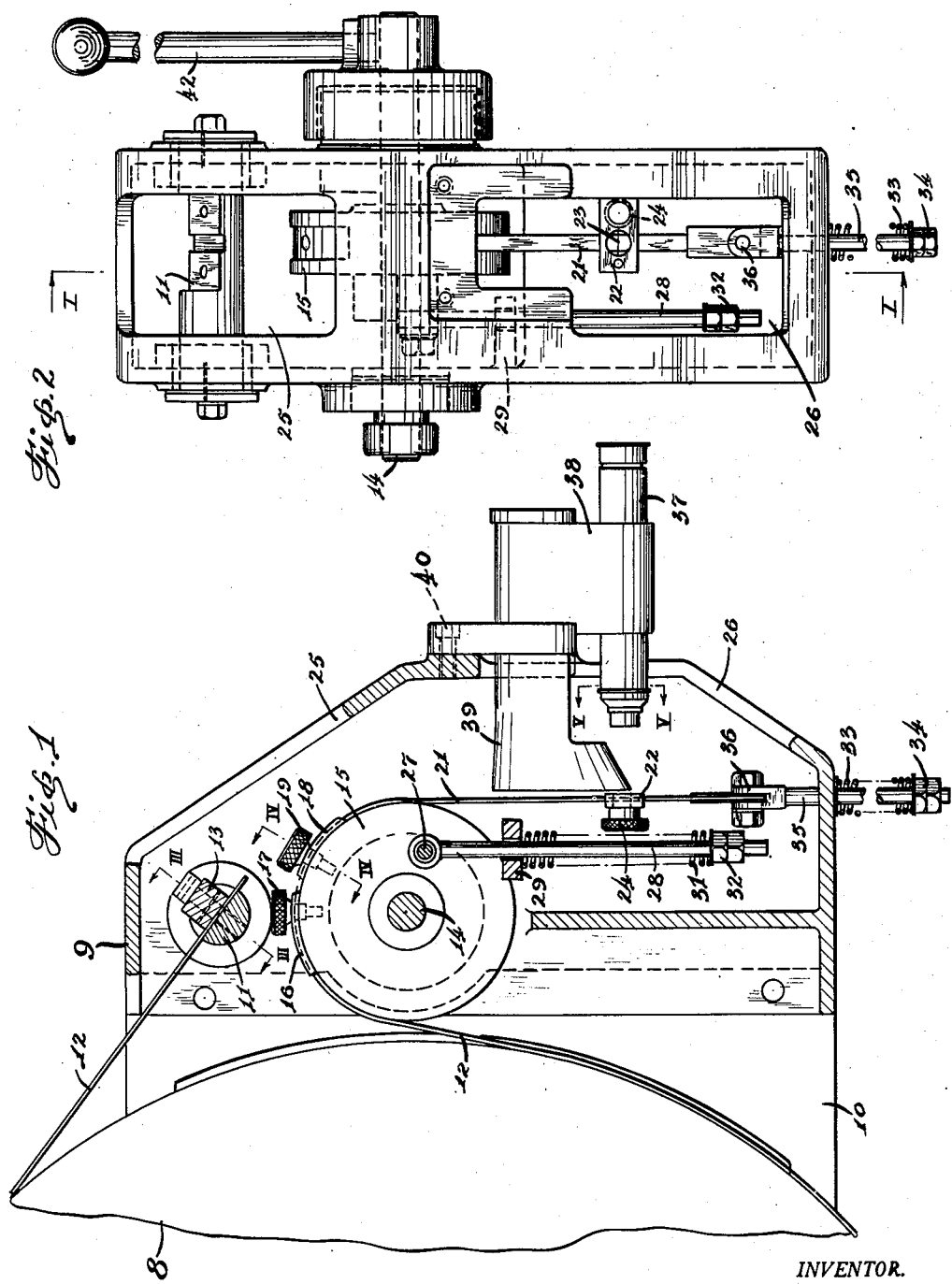
INVENTOR.
JOHN A. ELMES
BY Archworth Martin
ATTORNEY.

Sept. 9, 1952          J. A. ELMES          2,609,610
GAUGE FOR ROLL CROWNS
Filed May 1, 1950          2 SHEETS—SHEET 2
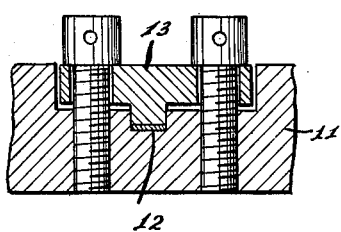
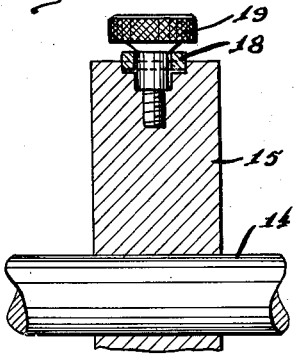
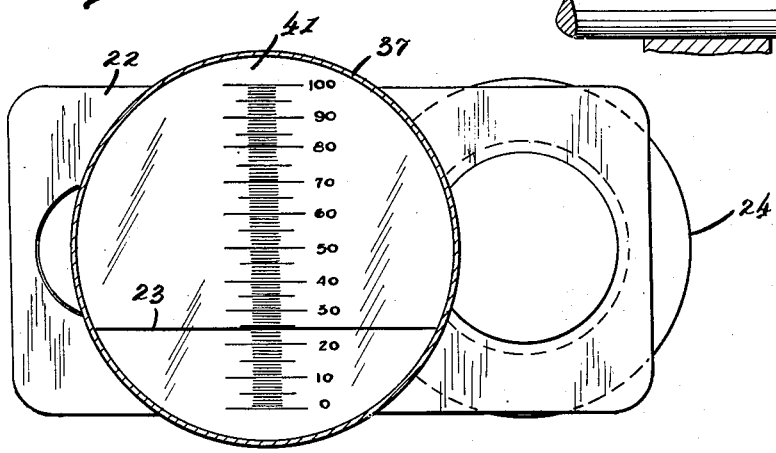
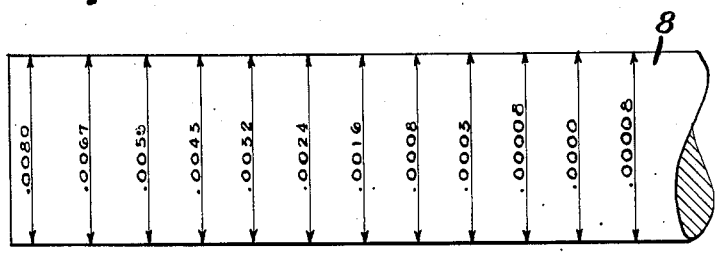
INVENTOR.
JOHN A. ELMES
BY Archworth Martin
ATTORNEY.

Patented Sept. 9, 1952

2,609,610

UNITED STATES PATENT OFFICE 2,609,610

GAUGE FOR ROLL CROWNS

John A. Elmes, Beaver Falls, Pa., assignor to Ryman Engineering Company, Ellwood City, Pa., a corporation of Pennsylvania Application May 1, 1950, Serial No. 159,313

4 Claims. (Cl. 33—179)

My invention relates to gauges or measuring devices for measuring the variations in diameters and hence the "crown" of rolls, and particularly to gauges wherein a tape is employed.

One object of my invention is to provide a gauge device of the character referred to that can be used to effect accurate measurement of roll diameters, without removing the rolls from their housings. The apparatus is particularly useful in the measuring of calender rolls, without the necessity of removing them from the stack, which is a laborious and time-consuming operation.

Another object of my invention is to provide a gauge device of the character referred to which can quickly and easily be employed to secure accurate measurements after roll grinding operations, to ascertain whether the grinding has been to the proper degree.

As shown in the accompanying drawings, Figure 1 is a vertical sectional view through the apparatus, taken on the line I—I of Fig. 2; Fig. 2 is a face view of the apparatus, with certain of the tape-holding clamps removed; Figs. 3 and 4 are enlarged views taken on the line III—III and IV—IV respectively of Fig. 1; Fig. 5 is an enlarged view taken on the line V—V of Fig. 1, through the telescope barrel, and Fig. 6 is a schematic view showing a portion of a roll, and indicating various lines at which measurements may suitably be taken.

A roll to be measured is indicated by the numeral 8. The measuring apparatus comprises a casing 9 having four feet or projections 10 at its corners for convenient and accurate seating against a roll face. This casing need be no more than about four inches in width and thus can readily be moved manually along a roll to secure measurements at various locations.

A shaft 11 is journaled in the upper part of the casing and is recessed to receive one end of a gauging tape 12 and a clamping block 13 therefor. The shaft anchors that end of the tape, although it will have some rocking movement to accommodate itself to rolls of various diameters.

A second shaft 14 is journaled in the casing and has a drum 15 to which the other end of the tape 12 is clamped through the medium of a clamping plate 16 and a thumb screw 17. The drum carries a second clamping plate 18 and thumb screw 19 for securing a target-carrying tape 21 to the drum. A target block or plate 22 containing a hair line as indicated at 23 is clamped to the tape 21 by a thumb screw 24, the block being adjustable longitudinally of the tape as will be hereinafter explained. The casing 9 has openings at 25 and 26 to provide access to the thumb screws and other parts within the casing.

The drum 15 has a crank pin 27 to which a pull rod or arm 28 is pivotally connected. The arm extends through a web 29 that is rigidly connected to the casing walls and which serves as a seat for a spring 31. The lower end of this spring seats against a nut 32 carried by the lower end of the rod, so that the drum 15 is biased in a clockwise direction to thereby hold the tape 12 snugly in engagement with the roll.

The target-carrying tape 21 is held under tension by a spring 33 which is interposed between the bottom of the casing and a nut 34 on the lower end of a rod 35 that is clamped at 36 to the tape.

In taking a measurement, a starting or zero point will be selected, and the hair-line block 22 adjusted longitudinally of the tape, so that it comes in alignment with one of the scale lines in the telescope as shown on Fig. 5. The spring 31 will hold the tape 12 snugly on the roll and the spring 33 hold the tape 21 tensioned, to avoid inaccuracies. A crank arm or handle 42 secured to an end of the shaft 14 will be moved to rock the drum 15 in a counterclockwise direction, to thereby permit of shifting the tape 12 along the roll 8 for the taking of desired measurements.

Readings will be had through a microscope 37 carried by a case 38 which also carries a lamp 39 that will afford the desired downwardly-directed illumination. The microscope is held in place by a screw 40 and contains a semi-transparent disc 41 near its forward end, upon which scale marks are provided as shown in Fig. 5. The microscope, the lamp and the scale disc can be of any suitable standard form, many of which are now available on the market. It will be seen that as the tape is moved to various positions at which the handle 36 will then be released and the springs 31 and 33 permitted to maintain the tapes 12 and 21 under tension, the position of the hair line 23 with relation to the scale 41 will afford an accurate reading of the roll diameter.

The microscope may suitably magnify to the extent of 40 diameters and the scale 41 be graduated in thousandths. Also, by measuring the major portion of the roll circumference, it will be seen that the diametral variations will be multiplied approximately by three on the scale, thus facilitating the making of accurate readings as to variations in roll diameters.

I claim as my invention:

1. Guaging apparatus comprising a tape adapted for looped engagement with a cylindrical body, a casing having means thereon for anchoring one end of the tape and being adapted to seat against the said body, a drum journaled in the casing and having connection with the other end of the tape, a spring-tensioned device for biasing the drum in a direction tending to wrap the tape thereon, an indicator tape secured at one end to the drum, and a spring device engageable with the other end of the indicator tape to maintain it under tension, the tape being provided with an indicating mark that is movable therewith upon movements of the drum.

2. Guaging apparatus as recited in the next preceding claim, wherein the indicator mark is on a block that is adjustable longitudinally of the tape.

3. Guaging apparatus comprising a tape adapted for looped engagement with a cylindrical body, a casing having means thereon for anchoring one end of the tape and being adapted to seat against the said body, a drum journaled in the casing and having connection with the other end of the tape, a spring-tensioned device for biasing the drum in a direction tending to wrap the tape thereon, an indicator tape secured at one end to the drum, a spring device engageable with the other end of the indicator tape to maintain it under tension, the tape being provided with an indicating mark that is movable therewith upon movements of the drum, and means on the casing to support a microscope in position to view the indicating mark.

4. Guaging apparatus comprising a casing having feet positioned to seat against a roll at circumferentially and axially spaced points and open at points adjacent to the feet, a tape extending through said openings and adapted to be looped around the roll, a rock shaft journaled in the casing and having means thereon for anchoring the tape, a drum journaled in the casing, and having connection with the other end of the tape, a spring-tensioned device for biasing the drum in a direction tending to wrap the tape thereon, an indicator tape secured to the drum, and a spring device engageable with the other end of the indicator tape to maintain it under tension, the tape being provided with an indicating mark that is movable therewith in longitudinal directions.

JOHN A. ELMES.

REFERENCES CITED

The following references are of record in the file of this patent:

UNITED STATES PATENTS

| Number | Name | Date |
| --- | --- | --- |
| 812,269 | Horton | Feb. 13, 1906 |
| 1,540,378 | Wasson | June 2, 1925 |
| 2,096,669 | Burgard | Oct. 19, 1937 |
| 2,129,582 | Johansson | Sept. 6, 1938 |
| 2,471,050 | Turrettini | May 24, 1949 |

FOREIGN PATENTS

| Number | Country | Date |
| --- | --- | --- |
| 269,739 | Italy | Dec. 2, 1929 |